F. J. Seymour,
Sheet-Metal Die.
No. 1,183. Reissued May 14, 1861.
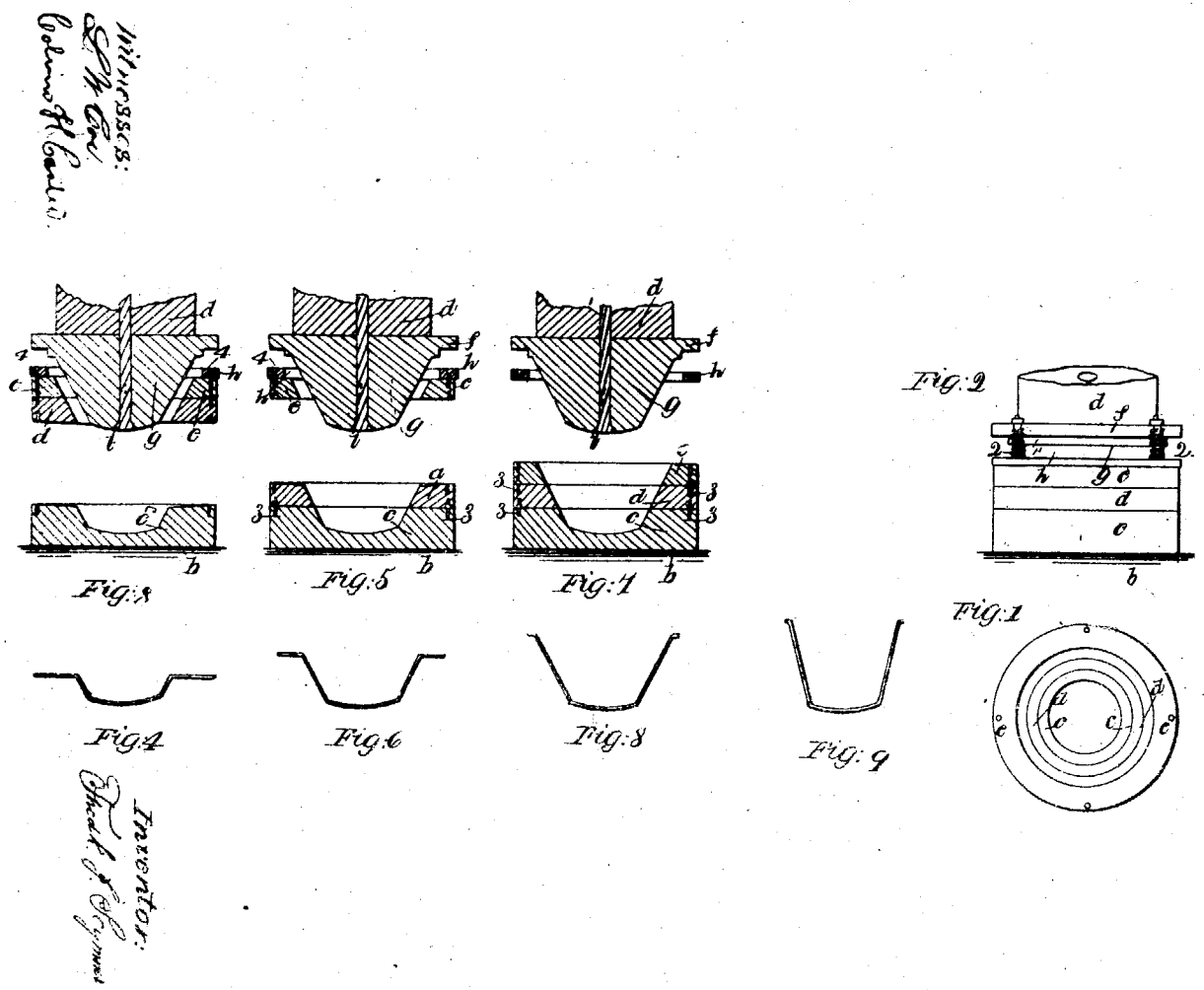
Witnesses:
L. W. Cox
Colin H. Carlile
Inventor:
Fred. J. Seymour

UNITED STATES PATENT OFFICE.

FREDERICK J. SEYMOUR, OF WATERBURY, CONNECTICUT, ASSIGNOR TO WATERBURY BRASS COMPANY.

IMPROVEMENT IN MAKING BRASS KETTLES.

Specification forming part of Letters Patent No. 14,887, dated May 13, 1856; Reissue No. 1,183, dated May 14, 1861.

*To all whom it may concern:*

Be it known that I, FREDERICK J. SEYMOUR, of Waterbury, in the county of New Haven and State of Connecticut, have invented certain new and useful Improvements in the Manufacture of Brass Kettles and Similar Articles from Sheet-Metal Disks; and I do hereby declare that the following, taken in connection with the drawings, is a full, clear, and exact description thereof.

In the drawings, Figure 1 is a plan of the lower or female die. Fig. 2 is an elevation of both dies, and the other figures, hereinafter referred to, are sections through the dies in the positions that they occupy in various stages of the process, and through the shapes resulting from each operation, except Fig. 9, which is a section through a finished kettle completed by a final operation of machine or hand spinning.

Prior to the date of my invention it had been attempted to stamp kettles by ordinary stamps and dies, and a patent was granted to one Thomas Hollister on the 9th day of May, 1848, for an improvement on the old process, in which is described a series of male dies or forces to be used in succession in stamping up kettles and similar articles, by which it was proposed to remedy the evils incident to the process of stamping up kettles from a flat disk. In using these dies (which, when attached to each other, were a counterpart of the inside of the finished kettle, and were, in fact, slices of an ordinary male die) the process described was to use first that slice which formed the upper part of the kettle, and thus to stamp up a shallow kettle of the full diameter at the open end. The next slice or die in succession was then affixed and the hat-shaped blank restamped, drawing the greater diameter of the kettle into the lesser and increasing the depth of the kettle, and slices or parts of the compound male die were added in succession until the kettle was shaped. The bottom was the last part formed, and the process of drawing the larger circles of the kettle into smaller ones by acting on the bottom involved great expenditure of power and stretched the metal thin on the bottom and edges, where it ought to be thickest. The practical result was that many kettles were spoiled in process of manufacture, and that those which passed through the ordeal and were finished were of very inferior quality. After this Hiram W. Hayden invented a plan for spinning kettles and similar articles of machinery, and patented the same December 16, 1851. This was a great improvement on all former processes, and by means of Hayden's machines vast numbers of kettles have been made, the only objections being that the process is not a very rapid one, and that imperfections in the original disk are extended and spread during the successive operations until they sometimes produce flaws or cracks on the surface. The process, moreover, is not adapted to produce some forms of kettle. Hayden's machinery was automatic; but kettles of small size have been spun up by hand, as lamps, candlesticks, tea-pots, &c., are spun; but this hand process is a slow and expensive one, and requires skill and experience on the part of the workman.

Now, my invention consists in a new mode or process of making kettles and similar articles by a combined process of stamping and spinning, the former being used for the preliminary operations, the latter for perfecting or completing the desired form, the whole process being substantially such as is described; and my invention also consists in a new or improved mode of stamping kettles into shape, as hereinafter described, which improved mode of stamping may be used in connection with a spinning process for coupling the kettle; and by "stamping" I mean any of the well-known processes by means of which a flat disk is converted into a concavity or hollow by being forced into a matrix or female die or dies by means of a male die or dies by blows of the dies upon the flat blank or disk; and by "spinning" I mean either the process as worked out automatically by Hayden's machine or the ordinary process in a hand-lathe, or lathe without a slide-rest, by means of both of which disks or forms are converted into other forms, while revolving in a lathe, under the effect of the pressure of a burnishing-tool; and by "similar forms to a kettle" I mean vessels capable of containing liquids, whose sections in a horizontal plane, or nearly so, (when the vessel rests upon its bottom,) are circles.

Now, in order to practice my improved combined process, I procure a blank or disk of suitable size and shape, and by a single or successive stampings reduce it into such shapes as may be desired, the general form being hat-shaped, or a concavity with a brim to it, like those shown in Figs. 4, 6, and 8. I then take the disk thus stamped and secure it in a lathe so that it will revolve rapidly, and complete the desired shape by spinning, preferring, as the best plan, to use my improved process of stamping, as hereinafter described, for the first operations, and Hayden's machinery for completing the shape by spinning, the complete shape being such as is practical and may be desired, and the progressive shapes, or those produced by stamping and spinning, being such as are least liable to strain the metal during those operations. The operation of stamping is a much quicker one than that of spinning, even by Hayden's machine, and is less expensive; and as long as the concavity is not too deep, or, in other words, so long as the vessel is not too much elongated and too nearly cylindrical, the stamping, when properly conducted, does not harm the metal materially. It, moreover, does not tend so much as spinning to increase the size of flaws and bring them to the surface. After the vessel is coned out or partially concaved, and when it could not be further shaped by stamping without injury to the metal, then the spinning process is peculiarly applicable in reducing the vessel either to a more acute cone or a form partially or wholly cylindrical. By combining these two processes together I am therefore enabled to produce both better and cheaper kettles than by any other process known to me, and to produce forms that could not be so well produced by spinning only, and could not be practically produced at all by stamping only.

As I have before stated, I prefer using in this combined process my new mode of stamping, and this new mode I will now proceed to describe, premising that by means of this process the metal is less wrinkled and strained, and its particles have to undergo fewer changes of position than in any other mode of stamping known to me. This process is carried out by means of an ordinary drop-press, to the follower or ram of which is to be bolted an ordinary force or male die, *a*. This die is to be a counterpart of the concavity of the vessel to be produced by stamping, and it is provided with a flange, *f*, at its upper edge. The female or lower die, which rests upon the bed-piece of the press *b*, is composed of several slices or rings, *c d e*, more or less in number, according to the exigencies of the work. When these dies are applied on top of each other, (see Fig. 7,) they make up a compound female die, which as a whole is the same as an ordinary female die. Each ring has holes drilled or tapped into it, in which may be fitted screws or steady-pins—such as 3 3—which will insure each die occupying its proper relative position. All the rings except the lower one have also holes tapped in them, into which screw-bolts 4 4 may be inserted, so as to hold one or more of the dies up to a ring, *h*, which latter is attached to the flange *f* by bolts 2 2. These bolts are free to slide in the flange, and are surrounded by strong spiral springs, (see Fig. 2,) which tend at all times to separate the ring *h* from the flange.

When it is desired to make a batch of forms, either in their ultimate shape or ready for spinning, the dies are at first arranged as in Fig. 3, with the steady-pins between the lower female die and the next upper ring removed, and the upper rings bolted to ring *h*, which is attached, as before described, to flange *f*. If a blank be now laid on the female die *c* and the ram or drop *a* be brought down, the flat blank will take the shape shown in section in Fig. 4, and in doing this the die *g* strikes only a little in advance of the ring *d*, so that the metal is drawn in under the pressure of the spiral springs, thus to a certain extent preventing wrinkling of the metal, while at the end of the stroke of the drop the flange strikes the rings, thus compressing the flat part of the sheet and smoothing out wrinkles. All the blanks are now to be annealed, and the dies are to be arranged as in Fig. 5, with ring *d* secured in place upon the bottom female die by the steady-pins, and ring *e* attached by bolts to the ring *h*. The blanks, being submitted to the action of the dies thus arranged, will take the form in Fig. 5, the bottom of ring *e* performing the duty formerly performed by the bottom of ring *d*. The blanks are now to be annealed again and the dies arranged as in Fig. 7, when the bottom of ring *h* will hold straighten out the flat parts of the blank. If the lower die be compounded of more than three rings, these transformations of arrangement of dies are to be repeated until all the rings compose and make up a single lower die, the blank taking a new shape at each time that another ring is ~~is~~ added to the lower die. Now, it will be observed that in this process of successive formation the bottom of the kettle or similar article is struck up first, and that its shape is not afterward altered by stamping; also that as each successive portion of the height of the kettle is formed by gradually drawing in the sides, it also never is forced to assume another form. It will also be perceived that after the bottom is struck up the male die acts but little, if at all, upon the bottom or upon the angle between the sides and the bottom of the vessel, but acts upon the constantly-changing angle between the part of the vessel already formed and the flat part of the disk; hence it results that the bottom is not strained or damaged, and is not reduced too thin; and as the particles take at once the position which they are to occupy in the finished article—that is, so far as it is finished by stamping— the sheet, as a whole, is less strained than by either the old stamping or the spinning processes, and a comparatively small amount of power is required for making the kettle. The number of blanks spoiled in this process is a very small percentage of the whole number, and the operation is a rapid one. The number of rings, and consequently the number of stampings and annealings, will depend upon the size and shape of the article when stamped for the last time, and instead of compound dies sets of single dies might be formed corresponding in shape with the shapes produced by uniting compound dies, as exhibited in the drawings, so that the various stages of the operation might each be performed in separate dies; but this plan would involve more expense in the manufacture of dies, while the mode of operation by stamping from the bottom upward, so as to complete the bottom first, and by gradually drawing in the sides form the mouth last, would be the same. When the stamping process is ended, the blank—such as shown in Fig. 8—may be reduced to its ultimate shape—such as exhibited in Fig. 9—either by hand-spinning or by the use of Hayden's machine.

I claim as of my own invention—

1. The production of kettles and articles of similar character by the combined processes of stamping to produce a preliminary shape, and spinning to complete the ultimate or finished form, substantially as herein described.

2. The new method or process, substantially as herein described, of stamping up vessels by a mode of operation in which the bottom is stamped up first, and the sides are then formed or drawn in in successive lengths by means of dies, substantially as hereinbefore set forth, and this I claim, whether the vessel be entirely finished by this new stamping process, or whether it be completed by a spinning process subsequent thereto.

In testimony whereof I have hereunto subscribed my name on this 1st day of March, A. D. 1861.

FREDERICK J. SEYMOUR.

In presence of—
CALVIN H. CARTER,
L. W. COE.